Figure 4:
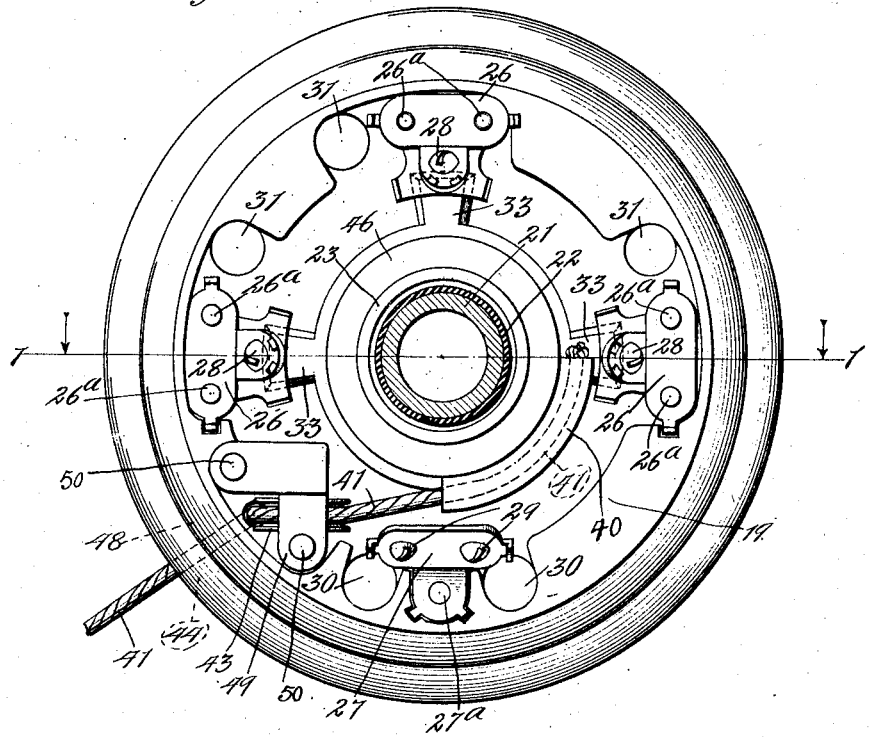

R. B. BENJAMIN.
ELECTRIC SWITCH.
APPLICATION FILED JULY 18, 1907.
1,005,926.
Patented Oct. 17, 1911.
5 SHEETS—SHEET 1.
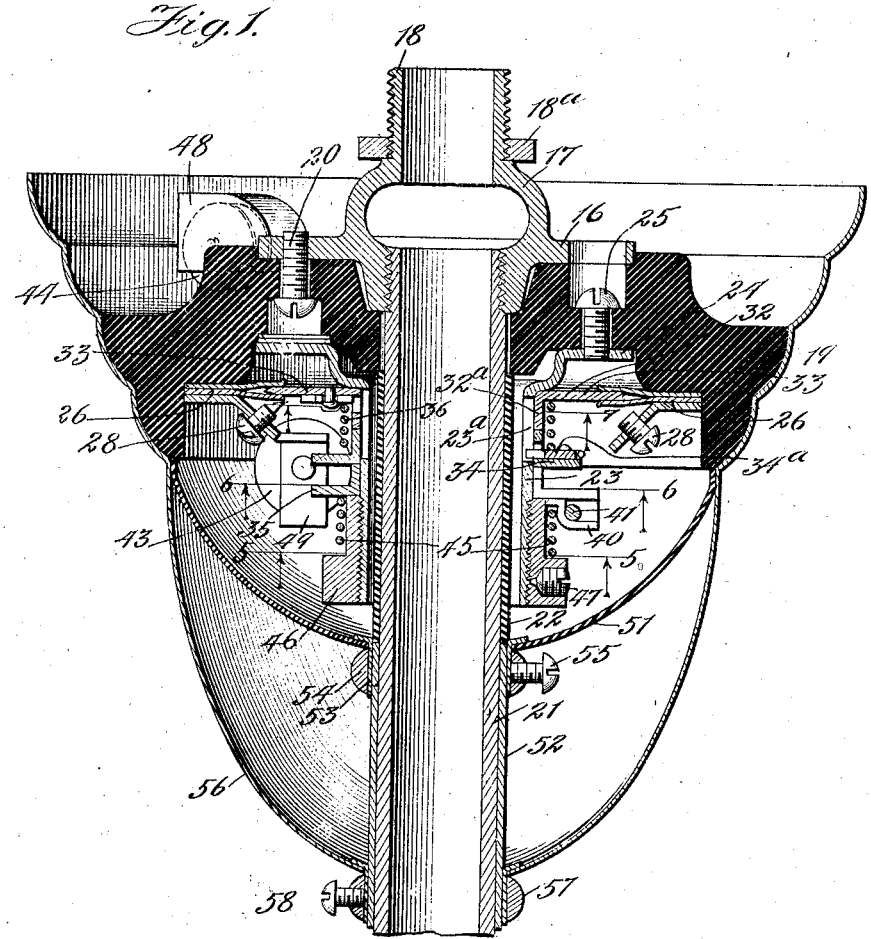

R. B. BENJAMIN.
ELECTRIC SWITCH.
APPLICATION FILED JULY 18, 1907.
1,005,926.
Patented Oct. 17, 1911.
5 SHEETS—SHEET 2.
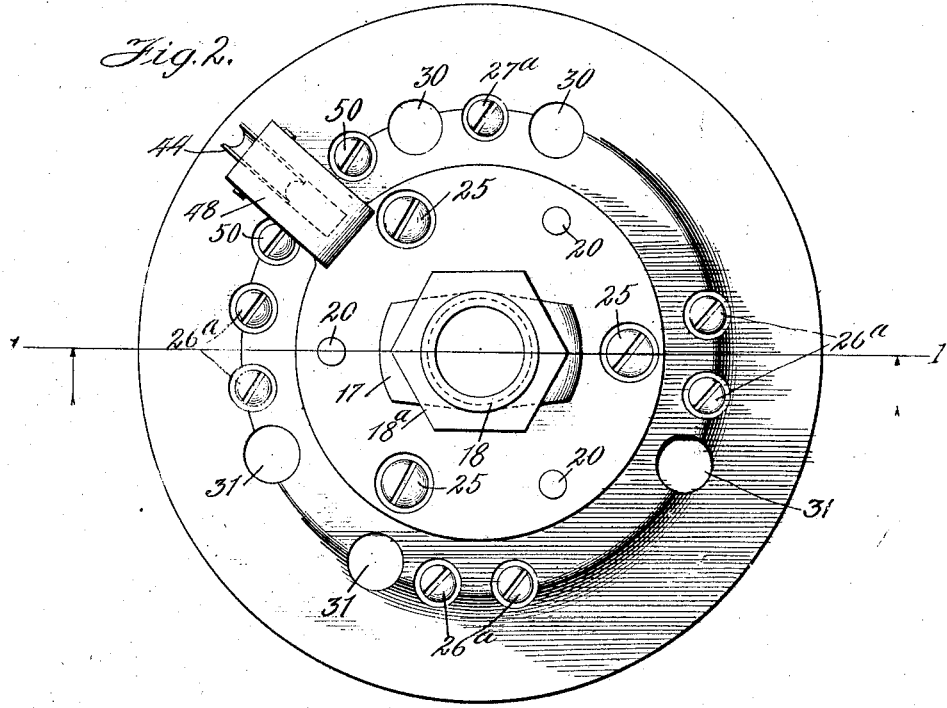
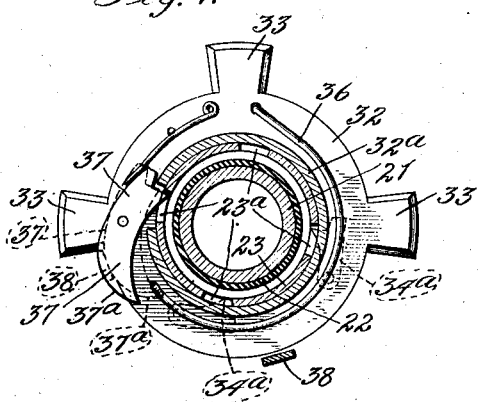
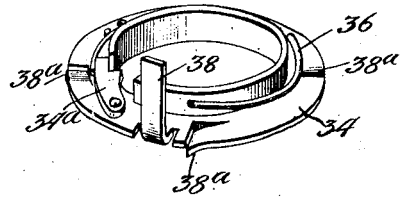
Witnesses:
Inventor:
Reuben B. Benjamin
By Jones, Addington & ...
Attys R. B. BENJAMIN.
ELECTRIC SWITCH.
APPLICATION FILED JULY 18, 1907.
1,005,926.
Patented Oct. 17, 1911.
5 SHEETS—SHEET 3.
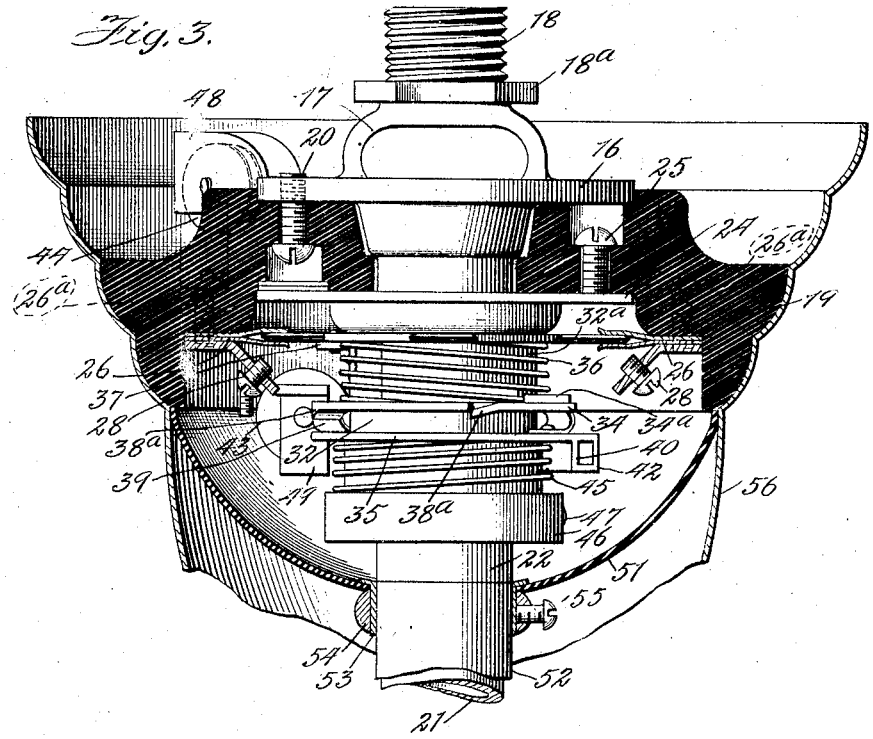
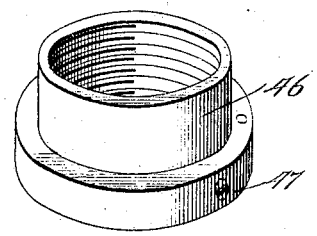
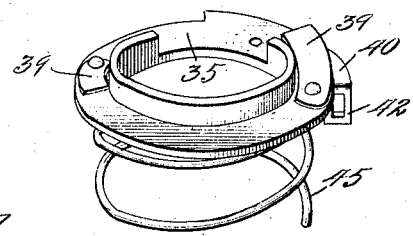
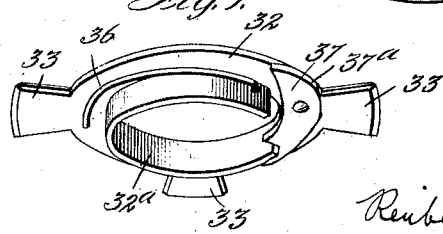
Witnesses:
Ira D. Perry
C. L. Hopkins
Inventor:
Reuben B. Benjamin
By Jones, Addington & Ames
Attys.

R. B. BENJAMIN.
ELECTRIC SWITCH.
APPLICATION FILED JULY 18, 1907.

1,005,926.

Patented Oct. 17, 1911.
5 SHEETS—SHEET 4.

Witnesses:
Ira D. Perry
C. L. Hopkins

Inventor:
Reuben B. Benjamin
By Jones, Addington & Ames.
Attys

R. B. BENJAMIN.
ELECTRIC SWITCH.
APPLICATION FILED JULY 18, 1907.
1,005,926.
Patented Oct. 17, 1911.
5 SHEETS—SHEET 5.
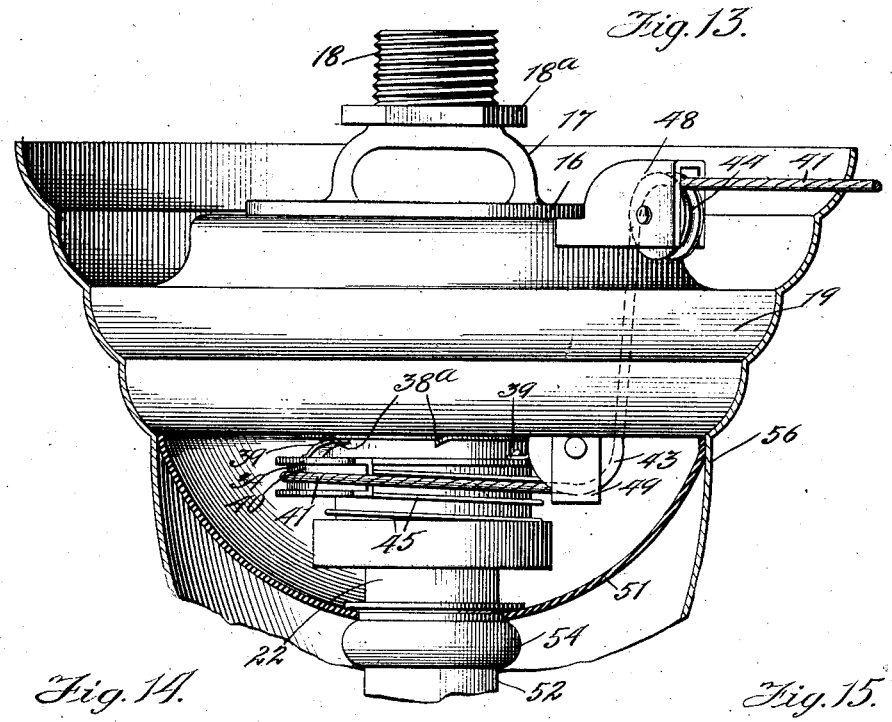
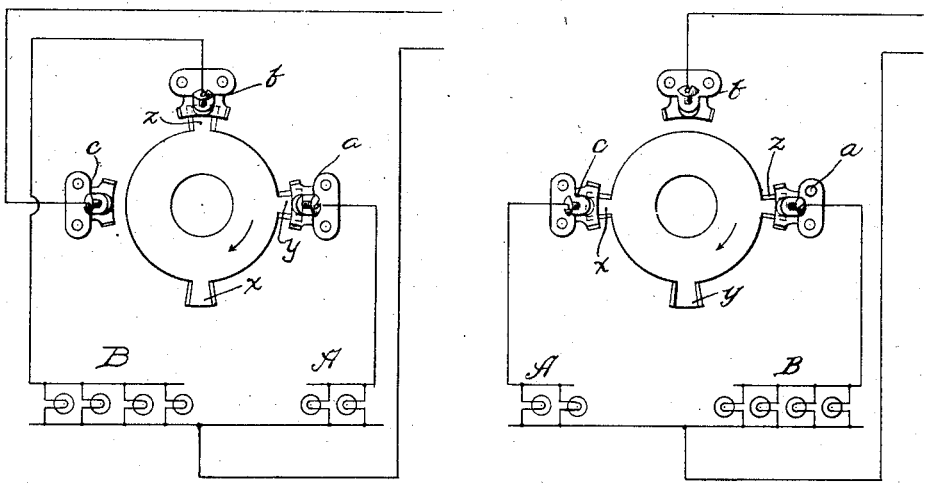
Witnesses:
Inventor:
Reuben B. Benjamin
By Jones, Addington & Ames
Attys

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

ELECTRIC SWITCH.

1,005,926.  Specification of Letters Patent.  Patented Oct. 17, 1911.

Application filed July 18, 1907. Serial No. 384,308.

*To all whom it may concern:*

Be it known that I, REUBEN B. BENJAMIN, a citizen of the United States, residing at Chicago, in the county of Cook and State of Illinois, have invented new and useful Improvements in Electric Switches, of which the following is a full, clear, concise, and exact description, reference being had to the accompanying drawing, forming a part of this specification.

This invention relates to electrical switching mechanism, and particularly to a type of such mechanism wherein various combinations of lamps or other translating devices are thrown into or out of circuit by a step-by-step rotary movement imparted to suitable switching instrumentalities.

In the use of incandescent electric lamps it is common practice to so combine groups of lamps, arranged in different circuits, with switching instrumentalities that various groups and combinations of groups may be lighted or extinguished at will. This method is frequently employed in lighting large spaces where it is desired to control the degree of illumination.

My invention, while of general adaptability, is of particular utility in combination with that kind of illuminating device known as a "cluster" wherein a unitary structure carries a plurality of incandescent electric lamps. In the use of these plural lamp-holding devices it is common to secure the cluster to the ceiling or to arrange the same upon the lower end of a depending pipe forming a conduit through which are led the circuit wires. If it is desired to control the number of lamps that are burning at one time the usual practice is to lead the wires to switching means located at a distance from the cluster.

My improved switching mechanism is adapted to be associated directly with the cluster of lamps. It may be connected to a suitable base-plate secured to the ceiling, in which case the cluster will depend from the bottom of the casing of the device, being either secured directly thereto or carried at the lower end of a pipe which is secured at its upper end to the casing of the switch mechanism. If desired the switch device may be located at some point between the ends of a conduit which extends downwardly from the ceiling, and will then form a part of such conduit. A cord, chain or the like will extend from the casing of the switch mechanism over a pulley or similar device to a convenient point for grasping by the hand of the person operating the device. To turn on or extinguish the lamps or to vary the number of lamps that are burning, this cord will be given a downward pull, and when released will be drawn up by suitable means provided for that purpose and hereinafter described.

Various circuit arrangements may be made, one of the possible arrangements giving the following effect: Suppose the lamps to be all turned off, the first pull imparted to the cord will light a single lamp, or a small number of lamps; the second pull will extinguish the lamp or lamps first lighted and turn on a larger group: the next pull will turn the first group on again, thus giving the greatest degree of illumination by having all the lamps burning, and the next pull will extinguish all of the lamps.

Figure 5:
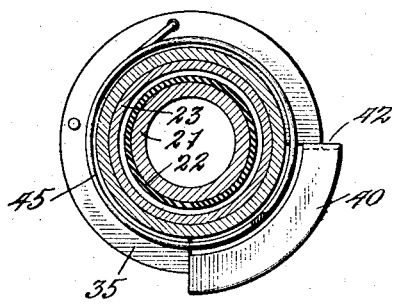
Figure 6:
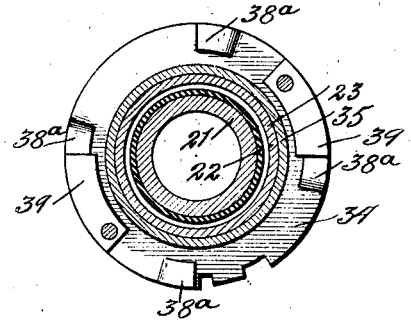

In the accompanying drawings, in which I have illustrated an embodiment of my invention, Figure 1 is a central vertical sectional view of the device, the section being taken on the line 1—1 of Figs. 2 and 4, looking in the direction of the arrows; Fig. 2 is a top plan view of the same; Fig. 3 is a view partly in elevation, and partly in section on the same plane as the section shown in Fig. 1; Fig. 4 is a bottom plan view of the device with the casing removed, looking upward; Figs. 5 and 6 show sections taken on the correspondingly numbered lines of Fig. 1 looking upward; Fig. 7 is a similar section taken on the line 7—7 of Fig. 1, showing the switch-blade-carrying member and means for releasably locking the same in position; Fig. 8 is a perspective view of a switch-blade releasing and moving member, this member being revolved with a step-by-step movement during the operation of the device; Fig. 9 is a perspective view of the revolving switch-blade-carrying member which is connected resiliently or yieldingly with the member shown in Fig. 8; Fig. 10 is a perspective view of an oscillatory pawl-carrying member to which is conducted and secured a cord, and which, upon each movement imparted thereto in one direction, moves the member shown in Fig. 8 forward one step; Fig. 11 is a perspective detail view of a member to which is secured an end of the spring which returns the pawl-carrying member to normal position when the cord is released from the hand of the operator;

Fig. 12 is a bottom plan view of a supporting plate which carries the device and which is adapted to be secured to the lower end of a conduit or to be screwed into a suitable socket secured to the ceiling; Fig. 13 is an elevational view of the device, with the outer casing or housing in section; and Figs. 14 and 15 are wiring diagrams showing different circuit arrangements which may be made.

In these several figures 16 is a supporting plate which may be constructed of cast iron and on which is formed an arch 17 having a screw-threaded neck 18 adapted to be screwed into a socket secured to the ceiling, or into the lower end of a pipe or the like. A set-nut 18a is provided on this neck 18 to assist in securing the part 16 firmly to the socket or pipe. Secured to the lower side of this support 16 is a base 19, of porcelain or the like, this base being held in place by screws 20 and carrying upon its lower side the switch contacts and associated parts. The base 19 is formed with a central opening through which extends a pipe 21, this pipe being screw-threaded for engagement with a screw-threaded opening in the support 16. The pipe 21 may extend downwardly to and carry upon the lower end a plural lamp-holding device such as a "cluster." Sleeved on the pipe 21 is an insulating tube 22, surrounding which is a cylindrical, preferably metallic hollow shaft 23 on which are supported and turn the revolving parts of the device. The upper end of the hollow shaft 23 is flanged outwardly at 24, and screws 25 secure this outwardly-flanged portion to the under side of the base 19.

Secured upon the under side of the base 19 are a series of switch contacts 26 arranged around the shaft 23 at equal distances from this shaft. When three of these contacts are provided, as in the device illustrated, they will be arranged in a circle which is divided at four equidistant points. The contacts 26 are located at three of these points and a connecting plate 27 is located at the other point. Each of the contact plates 26 is held in place by a pair of screws 26a and is provided with a binding-screw 28. The plate 27 is secured in place by a screw 27a and has a pair of binding-screws 29, to one of which will be secured one of the line wires and to the other of which will be secured a wire which branches into two wires. Each of these two wires will lead to and supply current to a lamp or group of lamps, and from each of these groups will extend a wire to one of the binding-screws 28. To the third or remaining binding-screw 28 will be secured the other line wire.

The line wires may, if desired, be led through the threaded neck 18 and will then be separated and carried outward toward the edge of the base 19, one of these wires passing through one of a pair of openings 30 in the base 19 to one of the binding-screws 29 carried by the plate 27. This plate 27 carries no switch contact, being merely a connecting plate provided for convenience in wiring up. Adjacent each of the contacts 26 is an opening 31, through which the wires leading to the lamps will pass, these wires then extending to the upper end of the pipe 21 and passing downwardly through this pipe.

Arranged on the shaft 23 and turning thereon are three movable parts, one of which comprises a plate 32 (shown detached in Fig. 9) having a series of three contact blades 33 arranged therearound. The second of these members comprises a ratchet ring 34 (shown detached in Fig. 8) which is moved forward with a step-by-step movement and is provided with means for preventing rotation in the opposite direction. The third of these members comprises a pawl-carrying ring 35 having a cord secured thereto, and so arranged that each pull upon the cord moves this member a given distance in one direction. Upon the cord being released this part is returned to its first position by suitable spring means.

The blade-carrying member 32 consists of an annular plate having three blades 33 extending radially therefrom, these blades being disposed at three of the quadrants of the circle. This plate 32 has formed thereon a cylindrical sleeve 32a which fits the shaft 23 and affords an extended bearing. A spring 36 is secured at one of its ends to the sleeve 32a and at its opposite end to the ratchet ring 34. A spring-pressed dog 37 is carried by the member 32 and is adapted to project through an opening in the sleeve 32a and into any one of a series of four openings 23a in the member 23. This pawl 37 permits the plate 32 to be rotated in one direction but prevents rotation of the same in the opposite direction. This pawl 37 is formed with a cam face 37a, upon which rides an upturned finger 38, carried by the ratchet ring 34, when this ring is rotated so as to bring the finger 38 into engagement with the dog 37, as shown in dotted lines in Fig. 7. The dog is thus moved on its pivot and the point of the same is withdrawn from the opening 23a. As the rotation of the ring 34 has wound up the spring 36, the blade-carrying member 32 will be thrown by the power thus stored up in the spring to the next position, or to such a position that the dog is inserted into the next succeeding opening 23. Connection is thus suddenly broken between the blades 33 and the contacts with which the blades are in engagement and connection is reëstablished between these blades and a different set of contacts.

The ratchet ring 34 is provided with a pivoted spring-pressed pawl 34ª which falls successively into each of the openings 23ª and prevents back-lash of the ratchet ring. This ratchet ring has formed thereon four down-turned teeth 38ª.

The pawl carrying ring 35 is provided with two spring pawls 39 which simultaneously engage two oppositely-disposed ratchet teeth on the ring 34, whereby rotary movement imparted to the ring 35 by a pull given to the cord secured thereto will be transmitted to the ratchet ring 34. When the ring 35 is released and returns to normal position the spring pawls 39 will slip over the ratchet teeth 38ª.

The ring 34 carries upon its under side a channel member 40 in which normally lies the end portion of the cord 41. This cord is secured at 42 and is led under a grooved pulley 43, thence upward and over the grooved pulley 44 and thence over pulleys or otherwise to a convenient point for grasping by the operator. When this cord is pulled the pawl-carrying ring 35 is moved around through about one-fourth of a revolution, carrying with it the ratchet ring 34. When the ratchet ring has advanced one-fourth of a revolution so as to carry the finger 38 from the position shown in Fig. 7 to the position shown in dotted lines in this figure the blade-carrying ring 32 will be released, as hereinbefore explained. When the cord 42 is released the ring 35 will be returned to normal position by a spring 45, which is coiled about the shaft 23 and is secured at one of its ends to the ring 35 and at its other end to a threaded collar 46. This collar 46 holds the various rings and springs in place on the shaft 23, and is prevented from turning on the shaft by a set-screw 47.

The upper pulley 44 is supported in a housing 48 formed on the supporting plate 16. The lower pulley 43 is supported by a bracket 49, which is secured to the under side of the base 19 by a pair of screws 50.

The under side of the base 19 and the switch contacts and associated mechanism are inclosed by an insulating shell 51 of vulcanized fiber or similar material. An outer metallic tubular casing 52, preferably of polished brass or the like, surrounds the pipe 21 and extends downward to the lighting device at the lower end of the pipe 21. To retain the insulating shell 51 in place, a collar 53 is slipped on over the pipe casing 52, and surrounding this sleeve 53 is a ring 54 having a set-screw 55 for securing the same in place. An outer metallic casing or shell 56 incloses the whole device and is held up in place on the base 19 by a ring 57 provided with a set-screw 58. The casing 56 is shaped like an inverted bell and is similar to the ordinary canopy.

It will be seen that the supporting plate 16 and its threaded neck 18 are adapted to form a means of connection between two parts of a conduit through which conductors may extend to a lighting device carried upon the lower end of such conduit. The pipe 21 screws into the lower side of this plate 16 and the neck 18 screws into a socket secured to the ceiling or into the end of a pipe. Carried upon this plate 16 is a base of insulating material which in turn carries the switch contacts and the operative parts of the device. By the use of such a construction convenience in installation is secured and the necessity of leading wires off to switching mechanism located at a distance from the lighting device is overcome.

In Fig. 14 I have shown diagrammatically a circuit arrangement which may be advantageously employed. A represents a group of two lamps and B represents another group of four lamps. By moving the rotating blade-carrying member on its pivot, either the groups A or B may be lighted or these two groups may be lighted simultaneously. By turning the blade carrier to another position, all of the lamps may be extinguished. The connections are as follows: One of the line wires goes to the contact $c$. The other line wire divides and goes to the two groups of lamps A and B. From the group A, a second wire leads to the contact $a$. From the group B a wire leads to the contact $b$. With the blades in the position shown in Fig. 14, the lamps are all extinguished as contact $c$, to which one of the line wires runs directly, is not in circuit. By turning the blade carrier through one-fourth of a revolution in the direction indicated by the arrow the blade $x$ is brought into engagement with the contact $c$; the blade $y$ will not engage a contact, and the blade $z$ will engage contact $a$. Connection is thus made across the blades from contact $c$ to contact $a$ which is connected with group A and this group containing two lamps will be lighted. By turning the blades through another fourth of a revolution, blade $x$ will be made to engage contact $b$, blade $y$ will engage contact $c$ and contact $a$ will not be engaged. Group B, containing four lamps will be lighted, group A being extinguished. When the blades are turned through another fourth of a revolution each contact is engaged and all of the six lamps are lighted. By turning the blade carrier through another fourth of a revolution the blades occupy such a position that contact $c$ is not engaged by any of these blades and the lights are therefore all extinguished.

Fig. 15 shows diagrammatically another circuit arrangement which may be employed. In this case one of the line wires runs to the contact $b$, the other line wire dividing and running to the groups of lamps A and B as in the other case. From the group A runs a wire to contact $c$ and from group B runs a wire to contact $a$. With the blades in the position shown all the lamps are extinguished. By turning the blade carrier through one fourth of a revolution in the direction indicated by the arrow, blade $x$ will engage contact $b$, blade $y$ will engage contact $c$ and blade $z$ will not engage any contact. Contact $a$ is not engaged, therefore group B is not lighted. Group A, of two lamps, will be lighted. By turning the blades through another fourth of a revolution, blade $x$ will engage contact $a$, blade $y$ will engage contact $b$, blade $z$ will engage contact $c$, and both groups of lamps will be lighted. By turning the blades through another fourth of a revolution blade $z$ will engage contact $b$, blade $y$ will engage contact $a$, and blade $x$ will not engage a contact. Group B only will be lighted. Another turn through one fourth of a revolution extinguishes all of the lamps.

Various other circuit arrangements may be employed but the two arrangements shown and hereinabove described are representative and will serve to sufficiently illustrate this part of the invention.

What I claim as my invention and desire to secure by Letters Patent, is:

1. The combination of a base, a conduit extending axially through said base, switch contacts carried by said base upon the inner side thereof and disposed around said conduit, a rotatable contact member revoluble around said conduit and adapted to engage said switch contacts, means for advancing said rotatable contact from one operative position to another, and a canopy inclosing the under side of said base, said canopy being movable along said conduit to expose the switch mechanism.

2. The combination of an insulating base having a conduit extending therethrough, a rotatable switching device surrounding said conduit and adapted to make and break circuit connections when rotated, binding terminals for said switching device, means for rotating said switching device with a step-by-step rotation, said base being apertured for the passage of lead wires to said binding terminals, and a canopy supported on and movable along said conduit and normally concealing the underside of said base.

3. The combination with a conduit, of a canopy supported thereby and movable therealong, a base secured to said conduit and extending across the open side of the canopy when the latter is in normal position, and having a central aperture, a snap switch device upon the lower side of said base, and flexible means extending upward through said base and thence to the exterior of said canopy for operating said switch device.

4. The combination with a canopy, of a base extending across and closing the open side thereof and having a central aperture, a member upon the upper side of said base for supporting said base and canopy, a snap switch device upon the lower side of said base, flexible means extending upward through said base and to the exterior of said canopy for operating said switch device, a pulley carried by said supporting member for said flexible operating means, and an insulating shield within said canopy below said switch device.

5. In an electrical switching mechanism, the combination of a hollow shaft, a switch-blade-carrying ring arranged to rotate about said shaft, said shaft having a plurality of openings disposed therearound, a spring-pressed pawl carried by said blade-carrying ring for engagement in said openings, a ratchet ring arranged to rotate about said shaft, means carried by said ratchet ring for releasing said pawl, resilient connection between said ratchet ring and said blade-carrying member adapted to be placed under strain by the rotation of said ratchet ring, whereby when said pawl is released said blade-carrying-member will be suddenly advanced until said pawl engages the next succeeding opening in the shaft, a pawl-carrying ring adapted to have oscillatory movement upon said shaft, a pawl carried thereby for engaging the teeth of said ratchet ring, means for manually oscillating said pawl-carrying ring in one direction and spring means for returning said ring to normal position, whereby the pawl carried thereby will engage a succeeding tooth on said ratchet ring.

6. In a device of the class described, the combination with a tubular shaft, of a switch-blade-carrying member mounted on said shaft, a spring-pressed pawl thereon adapted for engagement within openings in said shaft, a ratchet member rotatable about said shaft, a spring connected therewith and with said switch-blade-carrying member, means carried by said ratchet member for actuating said pawl to disengage the same from said openings, an oscillating pawl-carrying member having pawls thereon adapted for engagement with said ratchet member.

In witness whereof, I have hereunto subscribed my name in the presence of two witnesses.

REUBEN B. BENJAMIN.

Witnesses:
M. L. HARRAR,
C. L. HOPKINS.